United States Patent [19]

Kurimoto et al.

[11] Patent Number: 5,218,025

[45] Date of Patent: Jun. 8, 1993

[54] METHOD FOR IMPROVING PROPERTIES OF VULCANIZED RUBBER CONTAINING INORGANIC WHITY FILLER

[75] Inventors: Isao Kurimoto, Toyonaka; Naoki Inui, Yamatokoriyama; Tetsuo Yamaguchi, Hirakata, all of Japan

[73] Assignee: Sumitomo Chemical Company, Limited, Osaka, Japan

[21] Appl. No.: 920,522

[22] Filed: Jul. 28, 1992

Related U.S. Application Data

[63] Continuation of Ser. No. 359,394, May 31, 1989.

[30] Foreign Application Priority Data

Jun. 7, 1988 [JP] Japan ................................ 63-141172
Jun. 7, 1988 [JP] Japan ................................ 63-141173

[51] Int. Cl.$^5$ ........................... C08K 5/32; C08K 5/17
[52] U.S. Cl. ................................ 524/249; 524/260; 524/574; 524/575; 524/576; 524/566
[58] Field of Search ............................ 524/260, 249

[56] References Cited

U.S. PATENT DOCUMENTS 3,756,969 9/1973 Danielson .
3,892,577 7/1975 Sugahara et al. .................. 524/417
4,507,418 3/1984 Utsunomipa et al. ............... 524/571

FOREIGN PATENT DOCUMENTS 0253365 1/1988 European Pat. Off. .

*Primary Examiner*—John C. Bleutge
*Assistant Examiner*—Mark Sweet
*Attorney, Agent, or Firm*—Stevens, Davis, Miller & Mosher

[57] ABSTRACT

Rubber filled with an inorganic whity filler such as white carbon is improved in its vulcanized rubber properties such as tensile strength, tear strength and heat build-up resistance by incorporating thereto a dinitrodiamine compound represented by the formula of

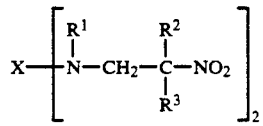

wherein X is a divalent aliphatic, alicyclic or aromatic group which may contain halogen or oxygen in the group, $R^1$ is hydrogen, an aliphatic group, an alicyclic group or an aromatic group, with the proviso that two nitrogen atoms linking through X may further link through $R^1$ when both X and $R^1$ are the aliphatic groups, and $R^2$ and $R^3$ independently of one another are each hydrogen or an alkyl of 1 to 12 carbon atoms, with the proviso that $R^2$ and $R^3$ may conjointly form a ring. The dinitrodiamine compound acts as a coupling agent for the rubber and the inorganic whity filler.

12 Claims, No Drawings

METHOD FOR IMPROVING PROPERTIES OF VULCANIZED RUBBER CONTAINING INORGANIC WHITY FILLER

This application is a continuation of application Ser. No. 07/359,394, filed May 31, 1989.

The present invention relates to a method for improving vulcanized rubber properties, particularly the properties of a rubber containing an inorganic whity filler, by using a particular coupling agent.

Whity rubber compositions blended with an inorganic whity filler such as white carbon (namely silica), talc and clay are frequently used for shoe soles, rubber rolls, and the like. One of the great requirements for such rubber compositions is to improve the vulcanized rubber properties such as tensile strength and tear strength.

On the other hand, rubber compositions blended with carbon black and an inorganic whity filler, particularly white carbon, are used for tire treads of automobiles such as construction vehicles which have a great opportunity to run on a bad road with high loads. In general, there are two kinds of requirements to improve the vulcanized rubber properties for the rubber materials used in the tire treads of construction vehicles, that is, improvement in cutting resistance corresponding to a cut on the surface of the tire treads when the vehicles run on a bad road, and improvement in heat build-up resistance corresponding to the durability of the tires.

In order to respond to such requirements, there have been heretofore made improvements in structures of the tires and investigations on compositions of the rubber. As the former methods, there is a proposal, for example, to change the tread shape by increasing contacting area on the ground so as to level a contacting pressure on the ground. As the latter methods, there are some proposals, for example, on improvement in microstructure or molecular weight distribution of the polymer, application of particular carbon black having the specific particle size and structure characteristics as a filler, and application of silica, namely so-called white carbon, in addition to carbon black as fillers.

Among the methods described above, the method to use white carbon in addition to carbon black as fillers is the preferred one from the viewpoints that it is able to improve the cutting resistance of vulcanized rubber more easily than the other methods, and that it can be widely used. In this method, however, the filling with white carbon is usually accompanied by the deterioration in tensile strength and heat build-up resistance of the vulcanized rubber.

Thus, the conventional rubber composition containing an inorganic whity filler such as white carbon is generally further blended with a silicon compound, the so-called silane coupling agent, represented by the formula of Y—SiZ₃ wherein Y is a functional group capable of reacting and bonding with rubber molecules, the representatives of which include vinyl, epoxy, methacryl, mercapto, polysulfido and the like, and Z is a hydrolyzable functional group capable of reacting with a silanol group on the white carbon, the representatives of which include methoxy, ethoxy, methoxyethoxy, chloro and the like.

The silane coupling agent is effective to some extent for improving the tensile strength, tear strength and the like in the whity rubber composition filled with an inorganic whity filler. However, recent requirements have been growing severe for the rubber filled with an inorganic whity filler such as white carbon demanding for higher tensile strength and higher tear strength, so that the conventional method of blending it with the silane coupling agent has been insufficient to cope with such requirements.

Besides, the silane coupling agent is also effective to some extent for resolving the problems such as the deterioration in tensile strength and heat build-up resistance of the rubber filled with both carbon black and white carbon. However, recent requirements for the vulcanized rubber properties have been growing severe, particularly in improvement of the heat build-up resistance, and hence, the method to blend it with the silane coupling agent have been difficult to cope with such requirements. The conventional silane coupling agent merely reacts with silanol groups on the white carbon at the hydrolyzable functional group Z in the above formula and does not have any function on the carbon black, as is clear from its chemical structure. Therefore, even if it is used in an increased amount, improving effects on the vulcanized rubber properties are deemed to be saturated showing not so markedly raised heat build-up resistance.

Under such circumstances, the inventors have made intensive research to develop a coupling agent which is quite different in its structure from and can be substituted for the conventional silicon compound of the above formula. The research has been made particularly in an attempt to develop a method for improving vulcanized rubber properties of the whity rubber composition filled with an inorganic whity filler such as white carbon, so that the rubber composition exhibits higher tensile strength and higher tear strength than those of a composition blended with the conventional silane coupling agent. The research has further been made in an attempt to develop a method for improving vulcanized rubber properties of the rubber composition filled with both carbon black and white carbon by using a coupling agent capable of exhibiting reciprocal action against both carbon black and white carbon, so that the rubber composition exhibits higher heat build-up resistance than the conventional one, upon maintaining the improving effect in tensile strength similar to the one blended with the conventional silane coupling agent. As a result, the present invention has been accomplished.

Thus, the present invention provides a method for improving properties of vulcanized rubber containing an inorganic whity filler which comprises blending a natural and/or synthetic rubber with an inorganic whity filler selected from white carbon, talc and clay, and a dinitrodiamine compound represented by the formula (I),

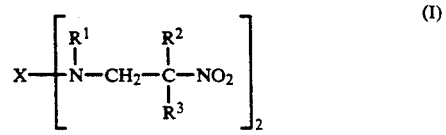

wherein X is a divalent aliphatic, alicyclic or aromatic group which may contain halogen or oxygen in the group, R¹ is hydrogen, an aliphatic group, an alicyclic group or an aromatic group, with the proviso that two nitrogen atoms linking through X may further link through R¹ when both X and R¹ are the aliphatic groups, and R² and R³ independently of one another are each hydrogen or an alkyl of 1 to 12 carbon atoms, with the proviso that R² and R³ may conjointly form a ring.

This method is effective to improve properties, particularly tensile strength and tear strength, of whity vulcanized rubber filled with an inorganic whity filler such as white carbon.

Further, the method accompanied by simultaneously blending with carbon black can produce a rubber composition which is improved in vulcanized rubber properties such as tensile strength and heat build-up resistance.

The present invention further provides a method for coupling a rubber and an inorganic whity filler such as white carbon, which comprises blending the rubber and the inorganic whity filler with a coupling agent comprising a dinitrodiamine compound represented by the above formula (I). In this method, if carbon black is also incorporated into the rubber, the coupling agent exhibits an reciprocal action against both the carbon black and the inorganic whity filler. In other words, it exhibits coupling functions between the rubber and the carbon black as well as between the rubber and the inorganic whity filler.

The present invention still further provides a rubber composition comprising a natural and/or synthetic rubber, carbon black, an inorganic whity filler and a dinitrodiamine compound of the above formula (I).

It has been known from European Patent Publication No. 253,365 that the dinitrodiamines represented by the formula (I) are compounds which improve dynamic properties such as impact resistance and heat build-up resistance of vulcanized rubber filled with carbon black etc.. However, it has been found out for the first time by the present invention that these compounds can be coupling agents for inorganic whity fillers such as white carbon, and that they are effective to improve vulcanized rubber properties such as tensile properties, tear strength and heat build-up resistance by incorporating them into the rubber filled with the inorganic whity fillers.

Coupling agents for inorganic whity fillers such as white carbon have hitherto been considered necessarily to possess a hydrolyzable functional group capable of reacting with and bonding to a silanol group on the inorganic whity filler. According to the present invention, however, it has been found that the hydrolyzable functional group is not necessarily needed.

The coupling agent of the present invention represented by the formula (I) is a basic compound as is clear from its structure. Therefore, it is inferred that the compound has a reciprocal action against an acidic silanol group on the inorganic whity filler such as white carbon.

Further, a characteristic feature of the dinitrodiamines represented by the formula (I) worthy of special mention is that they are able to exhibit a reciprocal action against both carbon black and an inorganic whity filler as compared with the conventional silane coupling agents which have a reciprocal action only against the inorganic whity filler. That is to say, since the dinitrodiamines of the formula (I) are basic compounds as described above, it is inferred that they make ionic reciprocal actions against acidic silanol groups in an inorganic whity filler such as white carbon, and against acidic carboxyl or phenolic hydroxyl groups in carbon black.

The dinitrodiamines represented by the formula (I) can be prepared by using a diamine, a nitroalkane and formaldehyde as starting materials, and subjecting them to a condensation reaction in an inert solvent. In the prepared procedure, a small amount of an alkaline compound may be used as a catalyst to accelerate the reaction.

As examples of the dinitrodiamines, mention may be made of the following compounds, wherein -Z represents

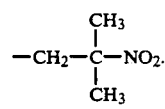

 (1)

 (2)

 (3)

 (4)

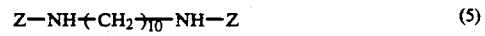 (5)

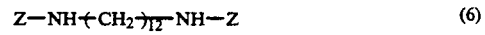 (6)

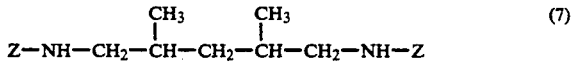 (7)

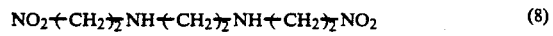 (8)

 (9)

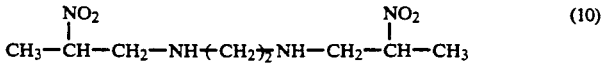 (10)

-continued
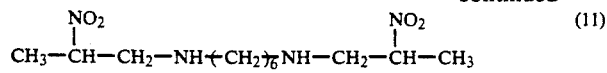 (11)
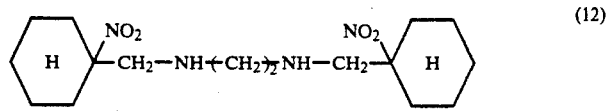 (12)
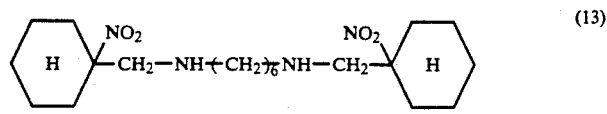 (13)
 (14)
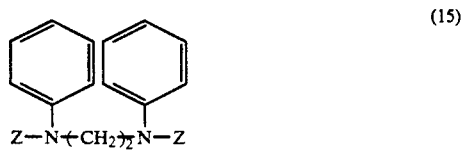 (15)
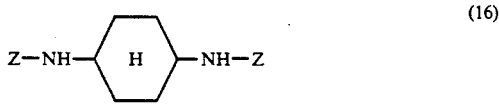 (16)
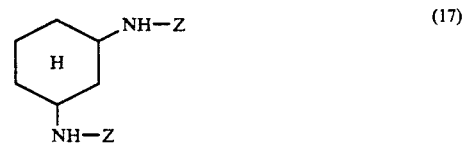 (17)
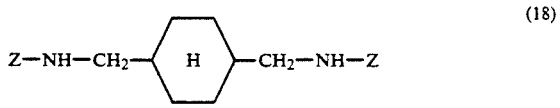 (18)
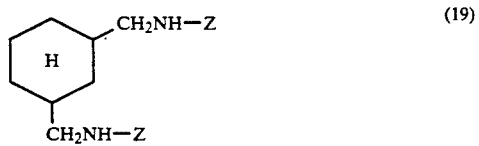 (19)
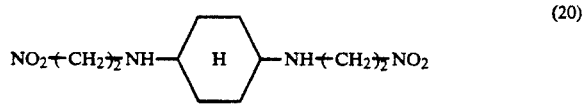 (20)
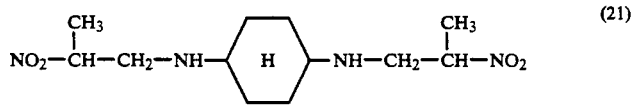 (21)
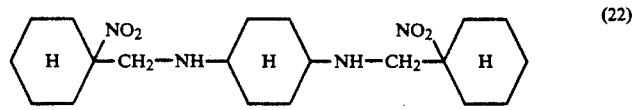 (22)
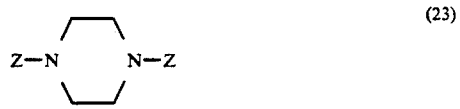 (23)

-continued
(24)
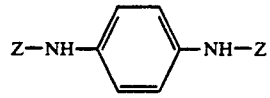
(25)
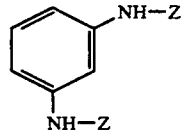
(26)
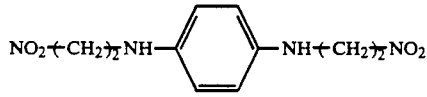
(27)
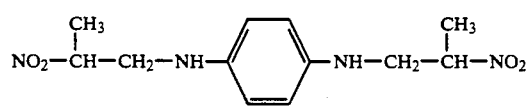
(28)
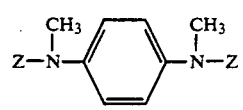
(29)
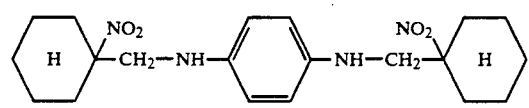
(30)
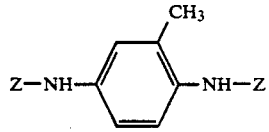
(31)
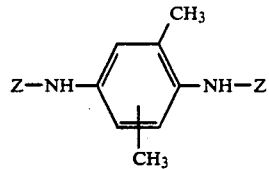
(32)
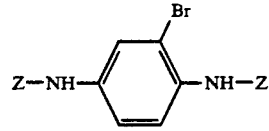
(33)
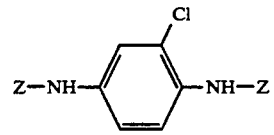
(34)
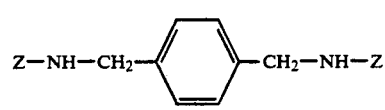
(35)

-continued
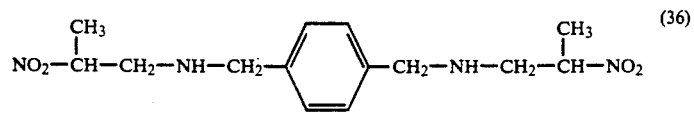 (36)
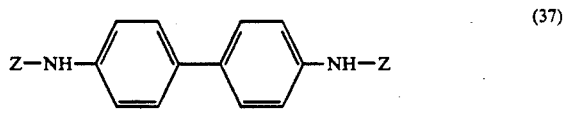 (37)
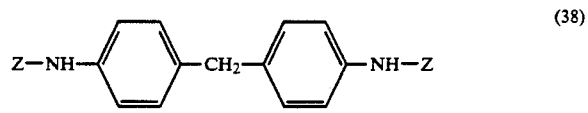 (38)
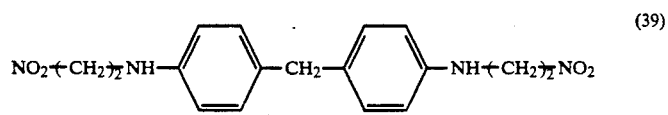 (39)
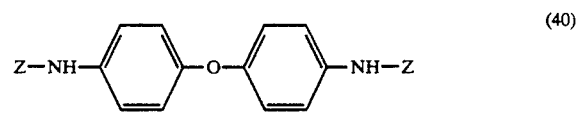 (40)
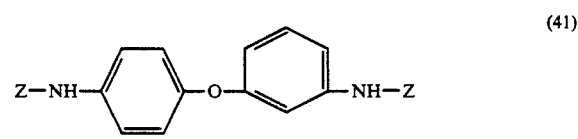 (41)
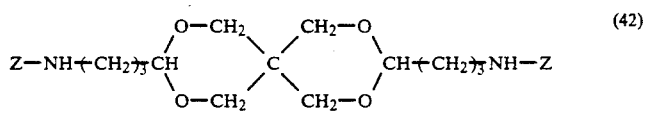 (42)
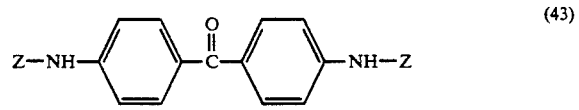 (43)
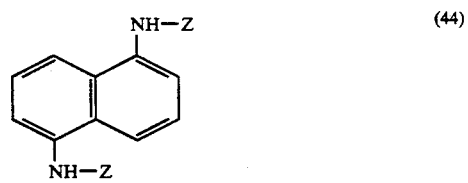 (44)
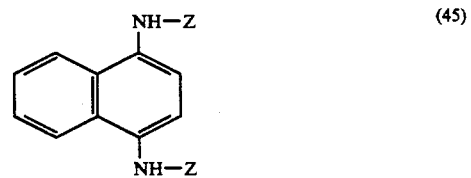 (45)
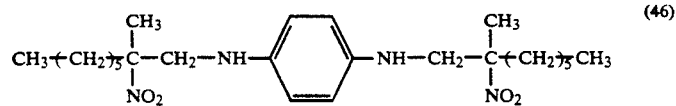 (46)
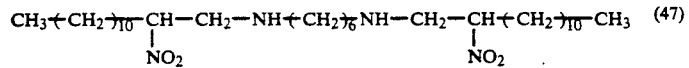 (47)

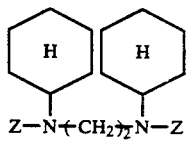
(48)

As exemplified above, the bridging group X in the formula (I) is a divalent aliphatic, alicyclic or aromatic group. X may contains halogen (e.g. fluorine, chlorine, bromine and iodine) in the group like the 33rd and 34th examples, and alternatively may contain oxygen in the group like the 40th to 43rd examples. The divalent aliphatic group denoted by X includes, for example, a straight chain or branched chain group, preferably an alkylene, of 1 to 18 carbon atoms and the like. The divalent alicyclic group denoted by X includes, for example, cyclohexylene,

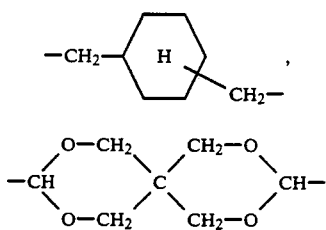

and the like. The divalent aromatic group denoted by X includes, for example, phenylene unsubstituted or substituted once or twice by lower alkyl (e.g. methyl) or halogen (e.g. chlorine or bromine)

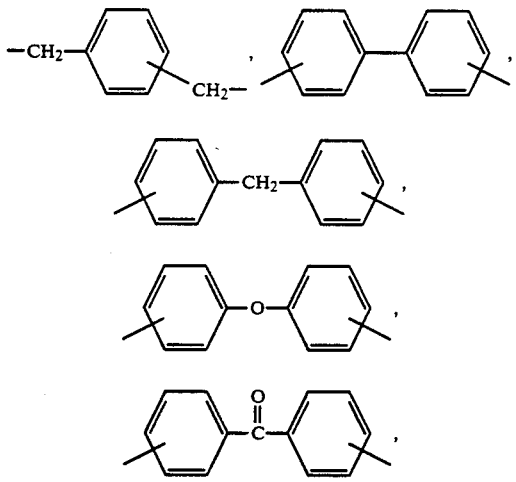

naphthylene and the like. Among them, preferred X is the aliphatic group. More preferably, X is the aliphatic group, particularly the alkylene, of 4 to 12 carbon atoms.

$R^1$ in the formula (I) is hydrogen, an aliphatic group, an alicyclic group or an aromatic group. The aliphatic group denoted by $R^1$ includes an alkyl of 1 to 6 carbon atoms and the like, the alicyclic group denoted by $R^1$ includes cyclopentyl, cyclohexyl and the like, and the aromatic group denoted by $R^1$ includes phenyl, tolyl and the like. Among them, preferred $R^1$ is hydrogen, the alkyl, cyclohexyl or phenyl, and more preferred is hydrogen. Alternatively, in case both X and $R^1$ are the aliphatic groups, two nitrogen atoms linking through X can further link through $R^1$ to form a ring composed of X, $R^1$ and two nitrogen atoms like the above 23rd and 24th examples. Such rings include, for example, piperazine ring and the like.

$R^2$ and $R^3$ in the formula (I) can be the same or different each other, and are hydrogen or an alkyl of 1 to 12 carbon atoms. Preferably, at least one of $R^2$ and $R^3$ is an alkyl of 1 to 12 carbon atoms, and more preferably they are both methyl. Alternatively, $R^2$ and $R^3$ can conjointly link to form, together with carbon atoms bonding to them, rings such as six-membered rings, like the above 12th, 13th, 22nd and 30th examples.

When incorporating these dinitrodiamines as coupling agents into rubber, they can be used in any forms of a single compound, a mixture of two or more of the compounds, a mixture with a carrier such as clay which does not affect the properties of rubber, or a mixture with other additives. The amount of the dinitrodiamine to be incorporated into rubber is not critical, but too small amount is insufficient for improving vulcanized rubber properties such as tensile strength, tear strength and heat build-up resistance, and too large amount is uneconomical because of saturation in improving effects. Thus, the amount is preferably from about 0.1 to about 10 parts by weight per 100 parts by weight of the rubber.

An inorganic whity filler used in the present invention is white carbon, talc or clay, among which white carbon is preferably used. These whity fillers can be used in a blending ratio similar to that of the conventionally applied one, and the amount or blending ratio is not critical in the present invention.

When carbon black is used in addition to the inorganic whity filler, these fillers, namely carbon black and the whity filler, can also be used in a blending ratio similar to that of the conventionally applied one. Among the combinations of carbon black and the inorganic whity fillers, that of carbon black and white carbon is especially preferred. In this combination, white carbon is incorporated into rubber in an amount of preferably not less than 5 parts by weight per 100 parts by weight of the rubber in order to improve cutting resistance which is one of the requirements for the tire treads of construction vehicles. Kinds of carbon black and white carbon are also not critical in the present invention, and various kinds of carbon black and white carbon conventionally utilized in the rubber industry can be used.

Rubbers usable in the present invention include natural rubber and various kinds of synthetic rubber generally utilized in the rubber industry. Among them, the preferred are natural rubber (NR), diene type rubber such as polyisoprene rubber (IR), styrene-butadiene copolymer rubber (SBR), polybutadiene rubber (BR), acrylonitrile-butadiene copolymer rubber (NBR) and isoprene-isobutylene copolymer rubber (IIR), and a polymer blend thereof.

In general, when natural rubber or synthetic rubber is blended with compounding ingredients, the compounding is principally carried out in two steps. That is to say, fillers, process oils, stearic acid, etc. are incorporated into the rubber at a first step of relatively high rubber temperature of from about 120° C. to about 170° C., while vulcanization accelerators and vulcanizing agents are incorporated at a second step of relatively low rubber temperature of from about 30° C. to about 120° C.

Compounding of the dinitrodiamine according to the present invention may be effected at any stage. Though it may be incorporated at the second step together with the vulcanization accelerator and the vulcanizing agent or at any step other than the above first and second steps it is preferably incorporated at the first step when the filler etc. are incorporated. As to the blending temperature, the higher the temperature is, the greater the improving effect in the vulcanized rubber properties is. However, since too higher blending temperature causes oxidative deterioration of the rubber, the temperature is normally preferred not higher than 200° C. In this stage, a small amount of a vulcanization accelerator or a vulcanizing agent such as morpholine disulfide may be incorporated as an auxiliary agent for the purpose of further increasing the effect.

When the rubber is blended with the dinitrodiamine and the inorganic whity filler or further carbon black, there may occur increase in the torque and activation of the vulcanization, and so a peptizer or a retarder may be used combinedly in order to moderate the actions. Further, in the rubber filled with the inorganic whity filler such as white carbon, the whity filler often adsorbs the vulcanization accelerator to retard the vulcanization, and hence, an anti-adsorbent such as triethanolamine may be used combinedly in order to moderate the retardation. Furthermore, ordinary rubber chemicals and softeners may of course be used together if necessary.

Next, the present invention will be explained by reference to the following preparation examples where the dinitrodiamines of the formula (I) are prepared, and to the following examples where the dinitrodiamines are incorporated into rubber to evaluate the properties thereof. The following examples including the preparation examples are only illustrative but not limitative for the present invention. In the examples, parts and % are by weight.

PREPARATION EXAMPLE 1

In a 1 liter four-necked flask equipped with a stirrer, a thermometer and a condenser was charged 156.8 g (1.76 mol) of 2-nitropropane, and thereto were added 200 ml of methanol as a solvent and 16.7 g (0.04 mol) of a methanolic solution of 40% trimethylbenzylammonium hydroxide as a catalyst. The mixture was heated to 50° C. and kept at that temperature, then 136.3 g (1.68 mol) of 37% formalin was added dropwise over about 1 hour. The reaction mass was thereafter heated to 60° C., and a 40° C. solution of 86.5 g (0.8 mol) of p-phenylenediamine dissolved in 500 ml of methanol was added dropwise to the mass over about 1 hour. After completion of the addition, the reaction mass was kept at 60° C. for about 4 hours. As a result, crystallization occurred and the reaction mass became slurry.

The reaction mass was gradually cooled down to 5° C. and then filtered to collect the precipitated crystals. The crystals were washed with methanol and water, and then dried under reduced pressure at a temperature of not higher than 50° C. to obtain 226.3 g of N,N'-bis(2-methyl-2-nitropropyl)-1,4-diaminobenzene with a yield of 91.1% based on p-phenylenediamine. The compound obtained was a pale yellow crystal form with a melting point of 135°-137° C. This compound will be referred to as compound A hereinafter.

An elemental analysis result of this compound was as follows:

|  | C | H | N |
|---|---|---|---|
| Found: | 54.13% | 7.22% | 18.09% |
| Calculated: | 54.18% | 7.14% | 18.05% |

This compound was confirmed from the FD-mass analysis, NMR spectrum and the identification by IR spectra to be represented by the following structural formula:

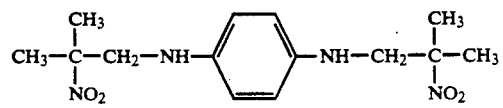

The following compounds B to D were prepared in the same manner as the above except that the starting materials were changed.

Compound B: N,N'-bis(2-nitropropyl)-1,3-diaminobenzene

Compound C: N,N'-bis(1-nitrocyclohexylmethyl)-4,4'-diaminodiphenylether

Compound D: N,N'-bis(2-methyl-2-nitrooctyl)-1,4-diaminobenzene

PREPARATION EXAMPLE 2

In a 1 liter four-necked flask equipped with a stirrer, a thermometer and a condenser were charged 116.2 g (1.0 mol) of 1,6-diaminohexane, 178.2 g (2.0 mols) of 2-nitropropane and 140 g of methanol. Under stirring, 162.3 g (2.0 mols) of 37% formalin was added dropwise thereto at 45°-55° C. over 1 hour. After the addition of formalin was completed, the mixture was kept at the same temperature for 1 hour, and then 200 ml of water was added thereto followed by separation into layers.

The oil layer was washed with 200 ml of water, and thereafter concentrated under conditions of 60° C. and 30 Torr to obtain 304 g of a pale yellow liquid. A high performance liquid chromatography assay of the liquid showed that it contained 298 g of N,N'-bis(2-methyl-2-nitropropyl)-1,6-diaminohexane and 5 g of 2-nitropropane.

To this liquid were added 300 ml of n-hexane and 150 ml of toluene, and the resulting solution was cooled to 5° C. As a result, crystallization occurred and the mixture became slurry. After filtering the mixture, the collected crystals were washed with 100 ml of cold n-hexane and then dried under reduced pressure at a temperature of not higher than 20° C. to obtain 288 g of N,N'-bis(2-methyl-2-nitropropyl)-1,6-dimainohexane. The compound obtained was a pale yellow crystal form with a melting point of 26°-27° C. The compound will be referred to as compound E hereinafter.

An elemental analysis result of this compound was as follows:

|  | C | H | N |
|---|---|---|---|
| Found: | 52.69% | 9.45% | 17.57% |

-continued

| | C | H | N |
|---|---|---|---|
| Calculated: | 52.81% | 9.50% | 17.60% |

The following compounds F and G were prepared in the same manner as the above except that the starting materials were changed.

Compound F: N,N'-bis(2-methyl-2-nitropropyl)-1,12-diaminododecane.

Compound G: N,N'-bis(2-methyl-2-nitropropyl)piperazine

EXAMPLE 1

Compound Formulation

| | |
|---|---|
| Natural rubber | 100 parts |
| White carbon | 45 parts |
| Stearic acid | 3 parts |
| Zinc oxide | 5 parts |
| Vulcanization accelerator (dibenzothiazyl disulfide) | 1 part |
| Sulfur | 2 parts |
| Triethanolamine | shown in Table 1 |
| Coupling agent | shown in Table 1 |

Using a 250 ml Laboplastomil ® (manufacture of Toyo Seiki Co.) as a Bumbury's mixer, the basal natural rubber, the coupling agent, white carbon, stearic acid, zinc oxide and triethanolamine as an anti-adsorbent were charged thereto in accordance with the above compound formulation at an oil bath temperature of 170° C., and the mixture was kneaded for 5 minutes with a mixer revolution of 60 rpm. The rubber temperature was 150°–160° C. at the kneading.

The rubber blend was then transferred to an open mill and kneaded while adding the vulcanization accelerator and sulfur shown in the above formulation at a temperature of 40°–50° C. The kneaded mixture was vulcanized with a vulcanizing press at a temperature of 145° C. for a period shown in Table 1 and shaped into test pieces of predetermined forms.

The coupling agents used were compounds A to G according to the present invention and bis(3-triethoxysilylpropyl)tetrasulfide (abbreviated as TEPT hereinafter) for comparison.

The test pieces were subjected to various tests by the following methods:

(1) Tensile properties

In accordance with JIS-K-6301, tensile strength, elongation at break and tensile stress ($M_{300}$) were measured using a No. 5 ring.

(2) Tear strength

In accordance with JIS-K-6301, a test was repeated 4 times, and their average value was calculated.

Table 1 shows blending conditions of the coupling agents and triethanolamine, vulcanizing conditions after blending, and test results of the vulcanized rubber properties.

TABLE 1

| | | Invention | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| Blend | | | | | | | | | | | | | | | | | |
| Kind of coupling agent | | A | A | A | B | C | D | E | E | E | F | G | A | B | C | D | E |
| Amount of coupling agent (parts) | | 0.5 | 1 | 2 | 1 | 1 | 1 | 0.5 | 1 | 2 | 1 | 1 | 1 | 1 | 1 | 1 | 1 |
| Amount of triethanolamine (parts) | | — | — | — | — | — | — | — | — | — | — | — | 1 | 1 | 1 | 1 | 1 |
| Vulcanizing period (min) | | 40 | 30 | 30 | 30 | 30 | 30 | 40 | 30 | 30 | 30 | 30 | 30 | 30 | 30 | 30 | 30 |
| Vulcanized rubber properties | | | | | | | | | | | | | | | | | |
| Tensile properties | Tensile strength (kg/cm²) | 160 | 188 | 221 | 185 | 190 | 184 | 168 | 192 | 228 | 194 | 182 | 253 | 256 | 261 | 249 | 250 |
| | Elongation at break (%) | 790 | 760 | 730 | 770 | 760 | 780 | 790 | 790 | 740 | 780 | 790 | 770 | 770 | 750 | 780 | 790 |
| | $M_{300}$ (kg/cm²) | 18 | 21 | 28 | 20 | 21 | 20 | 19 | 21 | 30 | 22 | 20 | 31 | 32 | 30 | 29 | 29 |
| Tear strength (kg/cm) | | 28 | 38 | 43 | 34 | 35 | 35 | 30 | 36 | 66 | 38 | 35 | 71 | 68 | 73 | 67 | 64 |

| | | Invention | | | | Comparison | | | | | | | |
|---|---|---|---|---|---|---|---|---|---|---|---|---|---|
| | | 17 | 18 | 19 | 20 | 1 | 2 | 3 | 4 | 5 | 6 | 7 | 8 |
| Blend | | | | | | | | | | | | | |
| Kind of coupling agent | | E | E | F | G | — | TEPT | TEPT | TEPT | — | TEPT | TEPT | TEPT |
| Amount of coupling agent (parts) | | 1 | 2 | 1 | 1 | — | 0.5 | 1 | 2 | — | 0.5 | 1 | 2 |
| Amount of triethanolamine (parts) | | 1 | 1 | 1 | 1 | — | — | — | — | 1 | 1 | 1 | 1 |
| Vulcanizing period (min) | | 30 | 30 | 30 | 30 | 50 | 50 | 50 | 50 | 50 | 40 | 30 | 30 |
| Vulcanized rubber properties | | | | | | | | | | | | | |
| Tensile properties | Tensile strength (kg/cm²) | 263 | 277 | 266 | 255 | 121 | 145 | 167 | 178 | 202 | 225 | 234 | 231 |
| | Elongation at break (%) | 760 | 700 | 760 | 750 | 720 | 760 | 770 | 710 | 790 | 770 | 730 | 720 |
| | $M_{300}$ (kg/cm²) | 33 | 41 | 35 | 30 | 12 | 17 | 20 | 26 | 21 | 29 | 32 | 33 |
| Tear strength (kg/cm) | | 72 | 119 | 81 | 68 | 23 | 26 | 29 | 30 | 29 | 53 | 60 | 64 |

EXAMPLE 2

Compound Formulation

| | |
|---|---|
| Natural rubber | 100 parts |
| HAF black | 45 parts |
| White carbon | 10 parts |
| Stearic acid | 3 parts |
| Zinc oxide | 5 parts |
| Vulcanization accelerator (N-cyclohexyl-2-benzothiazolylsulfenamide) | 1 part |
| Sulfur | 2 parts |
| Triethanolamine | shown in Table 2 |

-continued

| Coupling agent | shown in Table 2 |

Using a 250 ml Laboplastomill ® (manufacture of Toyo Seiki Co.) as a Bumbury's mixer, the basal natural rubber, the coupling agent, carbon black, white carbon, stearic acid, zinc oxide and triethanolamine as an antiadsorbent were charged thereto in accordance with the above compound formulation at an oil bath temperature of 170° C., and the mixture was kneaded for 5 minutes with a mixer revolution of 60 rpm. The rubber temperature was 150°–160° C. at the kneading.

The rubber blend was then transferred to an open mill and kneaded while adding the vulcanization accelerator and sulfur shown in the above formulation at a temperature of 40°–50° C. The kneaded mixture was vulcanized with a vulcanizing press at a temperature of 145° C. for a period shown in Table 2 and shaped into test pieces of predetermined forms.

The coupling agents used were the same as those used in Example 1.

The test pieces were subjected to various tests by the following methods.

(1) Impact resilience

In accordance with JIS-K-6301, it was measured by using a Lüpke type tester.

(2) Tensile properties

In accordance with JIS-K-6301, tensile strength, elongation at break and tensile stress ($M_{300}$) were measured using No. 5 ring.

(3) Heat build-up resistance

In accordance with ASTM-D-623-58, the test was conducted by using a Goodrich type heat build-up tester under a load of 35 lbs, a stroke of 6.35 mm, a frequency of 1,800 rpm and a chamber temperature of 40° C. A heat build-up temperature after 40 minutes was determined by indicating the difference between the rubber temperature after 40 minutes and the initial rubber temperature.

Table 2 collectively shows blending conditions of the coupling agents and triethanolamine, vulcanizing conditions after blending, and test results of the vulcanized rubber properties.

TABLE 2

| | Invention | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Blend | | | | | | | | | | | | | | | | |
| Kind of coupling agent | A | A | A | B | C | D | E | E | E | F | G | A | B | C | D | E |
| Amount of coupling agent (parts) | 0.5 | 1 | 2 | 1 | 1 | 1 | 0.5 | 1 | 2 | 1 | 1 | 1 | 1 | 1 | 1 | 0.5 |
| Amount of triethanolamine (parts) | — | — | — | — | — | — | — | — | — | — | — | 1 | 1 | 1 | 1 | 1 |
| Vulcanizing period (min) | 15 | 15 | 15 | 15 | 15 | 15 | 15 | 15 | 15 | 15 | 15 | 15 | 15 | 15 | 15 | 15 |
| Vulcanized rubber properties | | | | | | | | | | | | | | | | |
| Impact resilience (%) | 66 | 68 | 69 | 67 | 68 | 68 | 68 | 69 | 70 | 69 | 68 | 66 | 64 | 65 | 65 | 66 |
| Tensile properties — Tensile strength (kg/cm$^2$) | 273 | 280 | 279 | 275 | 282 | 281 | 280 | 284 | 282 | 283 | 279 | 270 | 269 | 269 | 272 | 269 |
| Elongation at break (%) | 500 | 490 | 470 | 500 | 480 | 490 | 500 | 490 | 460 | 480 | 490 | 490 | 500 | 500 | 490 | 500 |
| $M_{300}$ (kg/cm$^2$) | 158 | 161 | 162 | 160 | 159 | 162 | 160 | 165 | 169 | 166 | 164 | 151 | 143 | 147 | 149 | 143 |
| Heat build-up resistance (°C.) | 40 | 38 | 35 | 42 | 37 | 36 | 38 | 34 | 32 | 34 | 37 | 37 | 39 | 37 | 37 | 38 |

| | Invention | | | | Comparison | | | | | | | |
|---|---|---|---|---|---|---|---|---|---|---|---|---|
| | 17 | 18 | 19 | 20 | 1 | 2 | 3 | 4 | 5 | 6 | 7 | 8 |
| Blend | | | | | | | | | | | | |
| Kind of coupling agent | E | E | F | G | — | TEPT | TEPT | TEPT | — | TEPT | TEPT | TEPT |
| Amount of coupling agent (parts) | 1 | 2 | 1 | 1 | — | 0.5 | 1 | 2 | — | 0.5 | 1 | 2 |
| Amount of triethanolamine (parts) | 1 | 1 | 1 | 1 | — | — | — | — | 1 | 1 | 1 | 1 |
| Vulcanizing period (min) | 15 | 15 | 15 | 15 | 20 | 20 | 20 | 20 | 15 | 15 | 15 | 15 |
| Vulcanized rubber properties | | | | | | | | | | | | |
| Impact resilience (%) | 67 | 68 | 67 | 65 | 63 | 63 | 63 | 64 | 61 | 65 | 66 | 66 |
| Tensile properties — Tensile strength (kg/cm$^2$) | 273 | 275 | 274 | 270 | 266 | 270 | 272 | 272 | 263 | 269 | 275 | 277 |
| Elongation at break (%) | 490 | 470 | 470 | 500 | 500 | 490 | 470 | 460 | 500 | 490 | 480 | 480 |
| $M_{300}$ (kg/cm$^2$) | 148 | 155 | 149 | 145 | 138 | 159 | 160 | 168 | 141 | 153 | 158 | 157 |
| Heat build-up resistance (°C.) | 35 | 32 | 30 | 37 | >60* | 45 | 42 | 40 | 55 | 44 | 43 | 43 |

*The test piece rubber was damaged

According to the present invention, the rubber filled with an inorganic whity filler such as white carbon can be improved in tensile strength and tear strength by incorporating thereto a coupling agent which has a structure quite different from a conventional silane coupling agent. Therefore, the whity rubber composition provided by the method of the present invention can be effectively used for rubber products including shoe soles, rubber rolls and the like.

Further, the rubber filled with carbon black and an inorganic whity filler can be improved in heat build-up resistance by incorporating the coupling agent according to the present invention while maintaining the improving effect in tensile strength to the level similar to that blending with the conventional silane coupling agent. Therefore, the rubber composition containing carbon black, an inorganic whity filler and a dinitrodiamine provided by the method can be effectively used as rubber materials for tire treads, particularly as those for tire trends of automobiles such as construction vehicles which have a great opportunity to run on a bad road with high loads. The rubber composition can also be used for other rubber products such as other parts of the tire, belts and rubber rolls.

What is claimed is:

1. A method for improving properties of vulcanized rubber containing an inorganic whity filler which comprises:

blending a natural or synthetic rubber with triethanolamine, white carbon, and a dinitrodiamine compound represented by the formula of

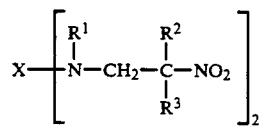

wherein X is an alkylene of 4 to 12 carbon atoms, m- or -phenylene or

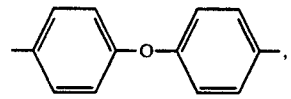

$R^1$ is hydrogen or forms a piperazine ring together with X and two nitrogen atoms bonding thereto, and $R^2$ and $R^3$ independently of one another are each hydrogen or an alkyl of 1 to 12 carbon atoms, with the proviso that $R^2$ and $R^3$ may conjointly form a cyclohexane ring together with the carbon atom bonding thereto, and wherein said triethanolamine is used in an anti-adsorption amount, said white carbon is used in an amount of from about 10 to about 45 parts by weight per 100 parts by weight of the rubber, and said dinitrodiamine compound is used in an amount of from about 0.1 to about 10 parts by weight per 100 parts by weight of the rubber;

adding a vulcanization accelerator and a vulcanizing agent to the rubber blend; and vulcanizing the resulting rubber blend, thereby obtaining a rubber product having improved mechanical strength.

2. The method according to claim 1, wherein the rubber is further blended with carbon black at the initial blending step.

3. The method according to claim 1, wherein the dinitrodiamine compound is the one where X is an alkylene of 4 to 12 carbon atoms and $R^1$ is hydrogen.

4. The method according to claim 1, wherein the dinitrodiamine compound is the one where X is m- or p-phenylene or

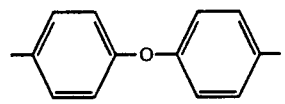

and $R^1$ is hydrogen.

5. The method according to claim 1, wherein the dinitrodiamine compound is the one where X, $R^1$ and two nitrogen atoms conjointly form a ring of

6. The method according to claim 1, wherein the dinitrodiamine compound is the one where one of $R^2$ and $R^3$ is an alkyl of 1 to 12 carbon atoms.

7. The method according to claim 6, wherein $R^2$ and $R^3$ are both methyl.

8. The method according to claim 1, wherein the dinitrodiamine compound is the one where $R^2$ and $R^3$ together with a carbon atom bonding thereto conjointly form a six-membered ring.

9. A method for coupling a rubber and white carbon which comprises:

blending the rubber and the white carbon with triethanolamine and a coupling agent comprising a dinitrodiamine compound represented by the formula of

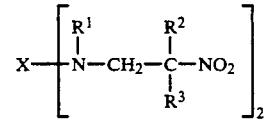

wherein X is an alkylene of 4 to 12 carbon atoms, m- or -phenylene or

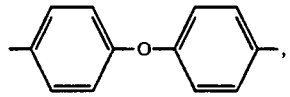

$R^1$ is hydrogen or forms a piperazine ring together with X and two nitrogen atoms bonding thereto, and $R^2$ and $R^3$ independently of one another are each hydrogen or an alkyl of 1 to 12 carbon atoms, with the proviso that $R^2$ and $R^3$ may conjointly form a cyclohexane ring together with the carbon atom bonding thereto, and wherein said triethanolamine is used in an anti-adsorption amount, said white carbon is used in an amount of from about 10 to about 45 parts by weight per 100 parts by weight of the rubber, and said dinitrodiamine compound is used in an amount of from about 0.1 to about 10 parts by weight per 100 parts by weight of the rubber;

adding a vulcanization accelerator and a vulcanizing agent to the rubber blend; and vulcanizing the resulting rubber blend, thereby achieving the coupling between the rubber and the white carbon.

10. The method according to claim 9, wherein the rubber is further blended with carbon black at the initial blending step, whereby the coupling agent acts further to couple the rubber and the carbon black.

11. A rubber composition comprising a natural or synthetic rubber, triethanolamine, white carbon, and a dinitrodiamine compound represented by the formula of

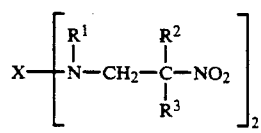

where X is an alkylene of 4 to 12 carbon atoms, m- or p-phenylene or

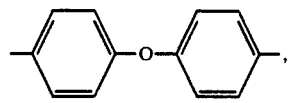

$R^1$ is hydrogen or forms a piperazine ring together with X and two nitrogen atoms bonding thereto, and $R^2$ and $R^3$ independently of one another are each hydrogen or an alkyl of 1 to 12 carbon atoms, with the proviso that $R^2$ and $R^3$ may conjointly form a cyclohexane ring together with the carbon atom bonding thereto, and wherein said triethanolamine is present in an anti-adsorption amount, said white carbon is present in an amount of from about 10 to about 45 parts by weight per 100 parts by weight of the rubber, and said dinitrodiamine compound is present in an amount of from about 0.1 to about 10 parts by weight per 100 parts by weight of the rubber, and said rubber composition is vulcanized in the presence of a vulcanization accelerator and a vulcanizing agent, and has improved mechanical strength.

12. The rubber composition according to claim 11, which further comprises carbon black.

* * * * *